(12) United States Patent
Li et al.

(10) Patent No.: US 8,966,128 B1
(45) Date of Patent: Feb. 24, 2015

(54) AUTO PLUG-IN AND PLUG-OUT VGA PORT DETECTION

(71) Applicant: Pericom Semiconductor Corporation, San Jose, CA (US)

(72) Inventors: Xianxin Li, Fremont, CA (US); Abdullah Raouf, Neward, CA (US); Hong-Leong Hong, Saratoga, CA (US); Anna Tam, Sunnyvale, CA (US)

(73) Assignee: Pericom Semiconductor, Milpitas, CA (US)

( * ) Notice: Subject to any disclaimer, the term of this patent is extended or adjusted under 35 U.S.C. 154(b) by 103 days.

(21) Appl. No.: 13/713,390

(22) Filed: Dec. 13, 2012

(51) Int. Cl.
G06F 3/00 (2006.01)
H04N 9/44 (2006.01)

(52) U.S. Cl.
CPC ........................................ H04N 9/44 (2013.01)
USPC ............................................. 710/17; 710/15

(58) Field of Classification Search
None
See application file for complete search history.

(56) References Cited

U.S. PATENT DOCUMENTS

| | | | |
|---|---|---|---|
| 6,452,402 B1 | 9/2002 | Kerai | |
| 6,614,206 B1 | 9/2003 | Wong | |
| D484,094 S | 12/2003 | Xiao | |
| 6,798,173 B2 | 9/2004 | Hsu | |
| 6,936,936 B2 | 8/2005 | Fischer | |
| 6,946,817 B2 | 9/2005 | Fischer | |
| 6,980,204 B1 | 12/2005 | Hawkins | |
| 7,017,055 B1 | 3/2006 | Ho | |
| 7,170,259 B2 | 1/2007 | Veselic | |
| 7,239,111 B2 | 7/2007 | Fischer | |
| 7,291,041 B1 | 11/2007 | Yang | |
| 7,338,328 B2 | 3/2008 | Krieger | |
| 7,358,703 B2 | 4/2008 | Veselic | |
| 7,376,846 B2 | 5/2008 | Hawkins | |
| 7,426,126 B1 | 9/2008 | Lai | |
| 7,453,233 B2 | 11/2008 | Fischer | |
| 7,477,247 B2* | 1/2009 | Yee | 345/213 |
| 7,724,026 B1* | 5/2010 | Tan | 326/30 |
| 8,237,414 B1 | 8/2012 | Li | |
| 8,427,392 B2* | 4/2013 | Lee | 345/3.1 |
| 2004/0246341 A1 | 12/2004 | Lee | |
| 2005/0114570 A1 | 5/2005 | Chang | |
| 2005/0174091 A1 | 8/2005 | Dayan | |
| 2006/0033474 A1 | 2/2006 | Shum | |
| 2006/0170393 A1 | 8/2006 | Yang | |
| 2006/0181241 A1 | 8/2006 | Veselic | |
| 2007/0005840 A1 | 1/2007 | Cheng | |
| 2007/0024239 A1 | 2/2007 | Park | |
| 2007/0088967 A1 | 4/2007 | Fu | |
| 2008/0042616 A1 | 2/2008 | Monks | |
| 2008/0278002 A1 | 11/2008 | Platania | |
| 2008/0303486 A1 | 12/2008 | Kao | |

OTHER PUBLICATIONS

U.S. Appl. No. 13/540,515, "Multi-Mode Charger Device", filed Jul. 2, 2012.

* cited by examiner

Primary Examiner — Idriss N Alrobaye
Assistant Examiner — Richard B Franklin
(74) Attorney, Agent, or Firm — The Webostad Firm

(57) ABSTRACT

Apparatus and method generally relating to load detection associated with an analog video port are disclosed. An embodiment of the apparatus for detection of a remote termination resistance includes a pulse detection circuit configured to generate a detection pulse within a blanking interval. A pulse insertion circuit is coupled to receive the detection pulse and is configured to insert the detection pulse onto a line, where the line is an analog color signal line.

18 Claims, 7 Drawing Sheets

Figure 1:
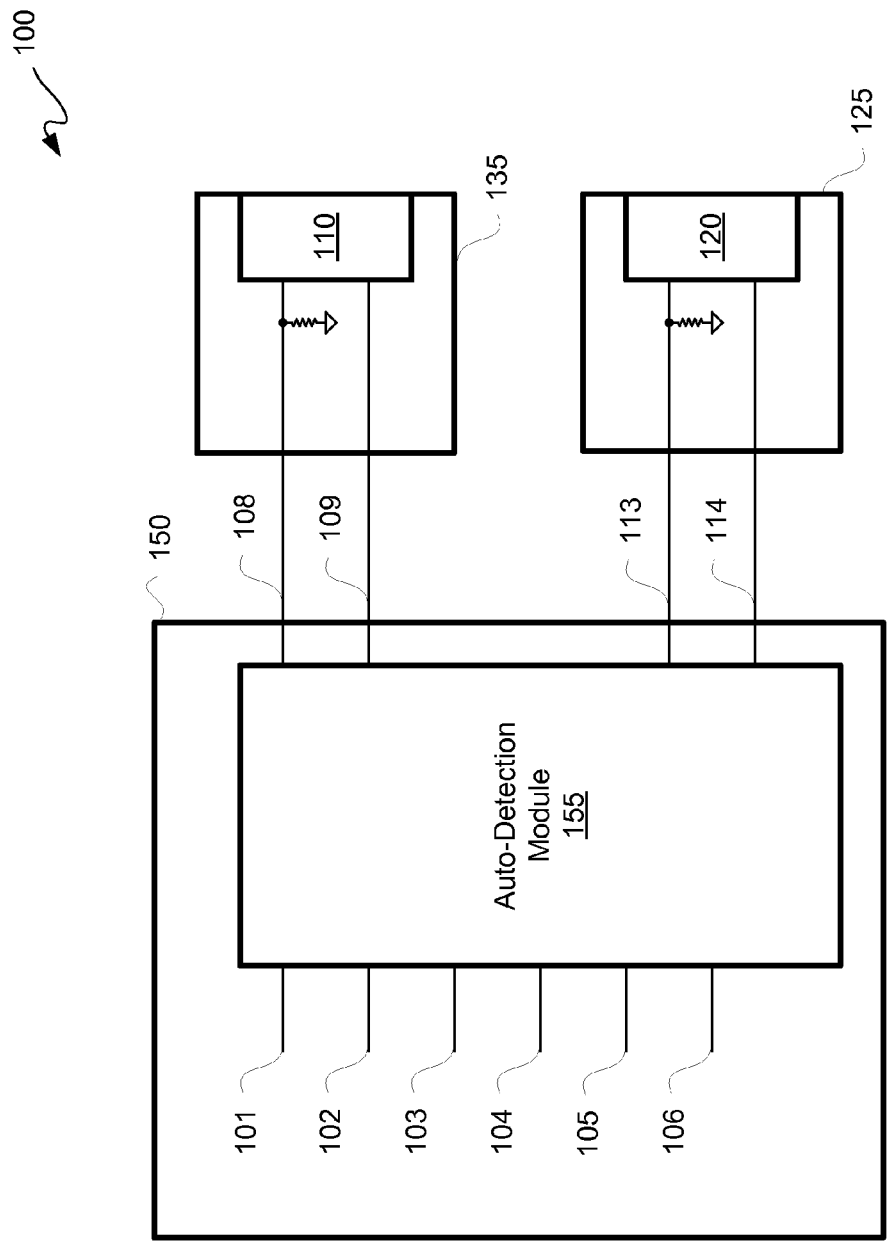

AUTO PLUG-IN AND PLUG-OUT VGA PORT DETECTION

FIELD

One or more embodiments generally relate to load detection. More particularly, one or more embodiments generally relate to load detection associated with an analog video port.

BACKGROUND

Conventionally, a notebook computer ("notebook") has at least one Video Graphics Array (VGA) port. In the past, a function key in combination with another key was used to toggle between the screen display of the notebook and a monitor coupled to a VGA port of the notebook. Thus, there was a way under software control invoked by user keystrokes to turn off the VGA port. However, in modern notebook computers, the VGA port is always on, and there is no way to turn-off the VGA port as there was in the past. Having the VGA port always on needlessly consumes power when the VGA port is not in use.

It should be understood that a VGA port uses analog RGB signals, as well as horizontal and vertical sync signals. It should further be understood that in contrast to a High-Definition Multimedia Interface ("HDMI") port, a VGA port does not have a pin dedicated to auto-detection of a monitor plugged into such port.

Accordingly, it would be desirable and useful to provide an auto-detect feature for a VGA port absent a dedicated auto-detect pin to conserve power when such VGA port is not in use.

BRIEF SUMMARY

One or more embodiments generally relate to load detection. More particularly, one or more embodiments generally relate to load detection associated with an analog video port.

An embodiment relates generally to an apparatus for detection of a remote termination resistance. In an embodiment, a pulse detection circuit is configured to generate a detection pulse within a blanking interval. A pulse insertion circuit is coupled to receive the detection pulse and is configured to insert the detection pulse onto a line, where the line is an analog color signal line.

Another embodiment relates generally to a method. In an embodiment, a pluggable adaptor is for insertion between a first display port of a computer device and a second display port of a display device. A detection pulse is generated within a blanking interval using a pulse detection circuit of the pluggable adaptor. The detection pulse is inserted onto a line using a pulse insertion circuit of the pluggable adaptor, where the line is an analog color signal line for the display device.

BRIEF DESCRIPTION OF THE DRAWING(S)

Accompanying drawing(s) show exemplary embodiment(s) in accordance with one or more aspects of the invention; however, the accompanying drawing(s) should not be taken to limit the invention to the embodiment(s) shown, but are for explanation and understanding only.

Figure 2:
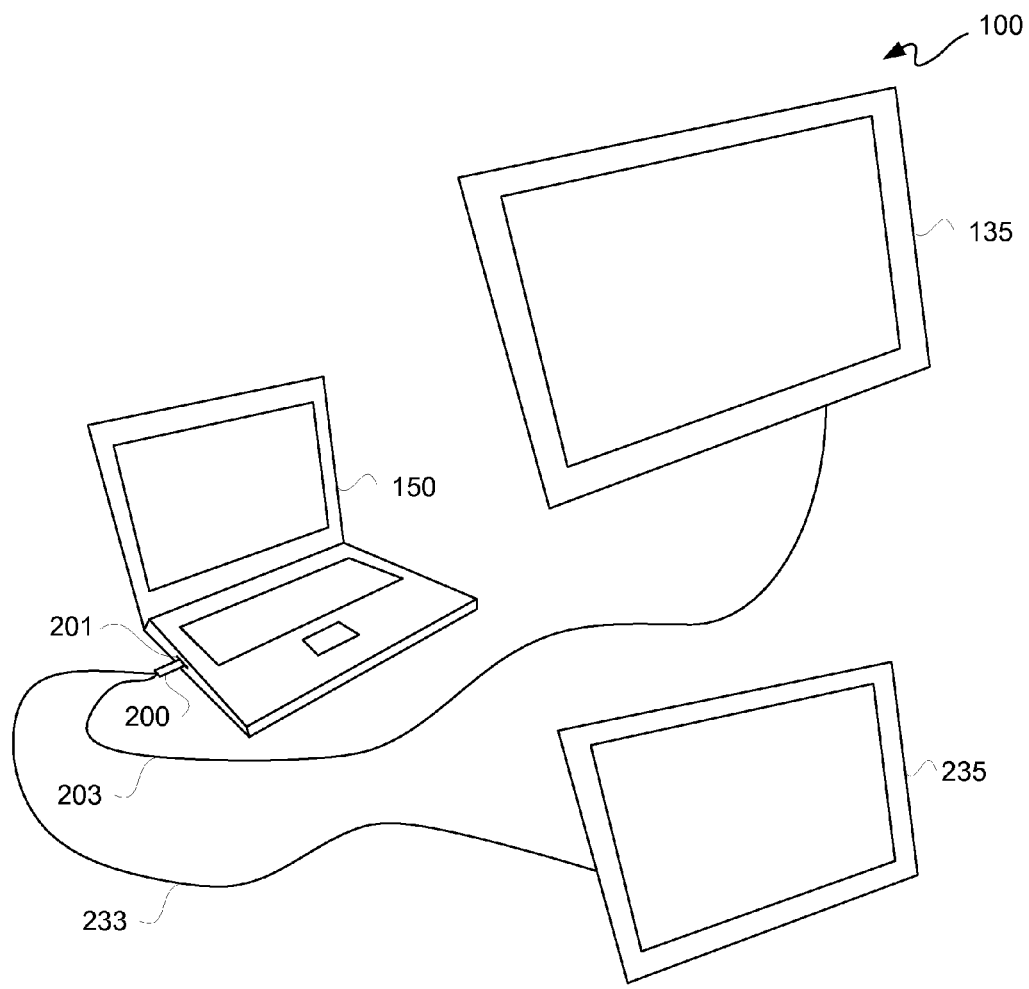
Figure 3:
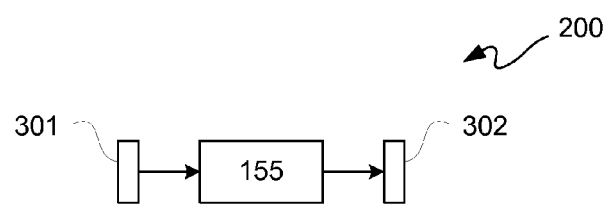
Figure 4:
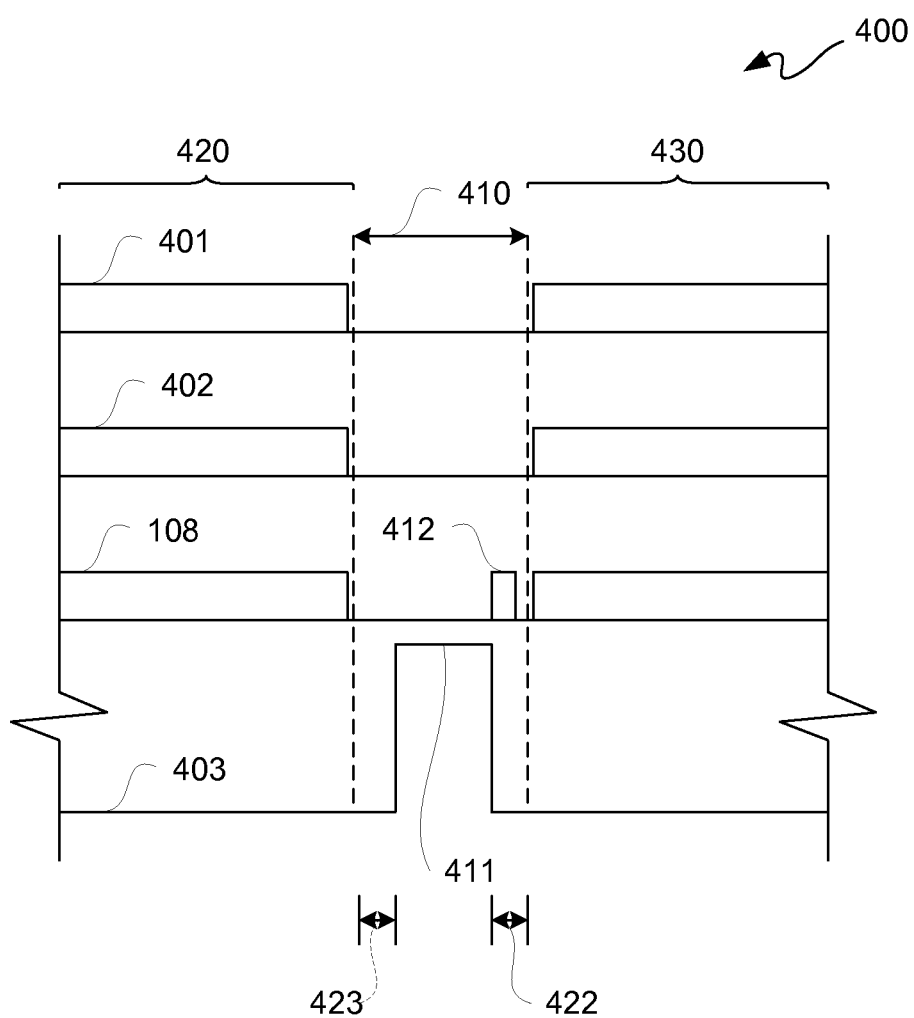
Figure 5:
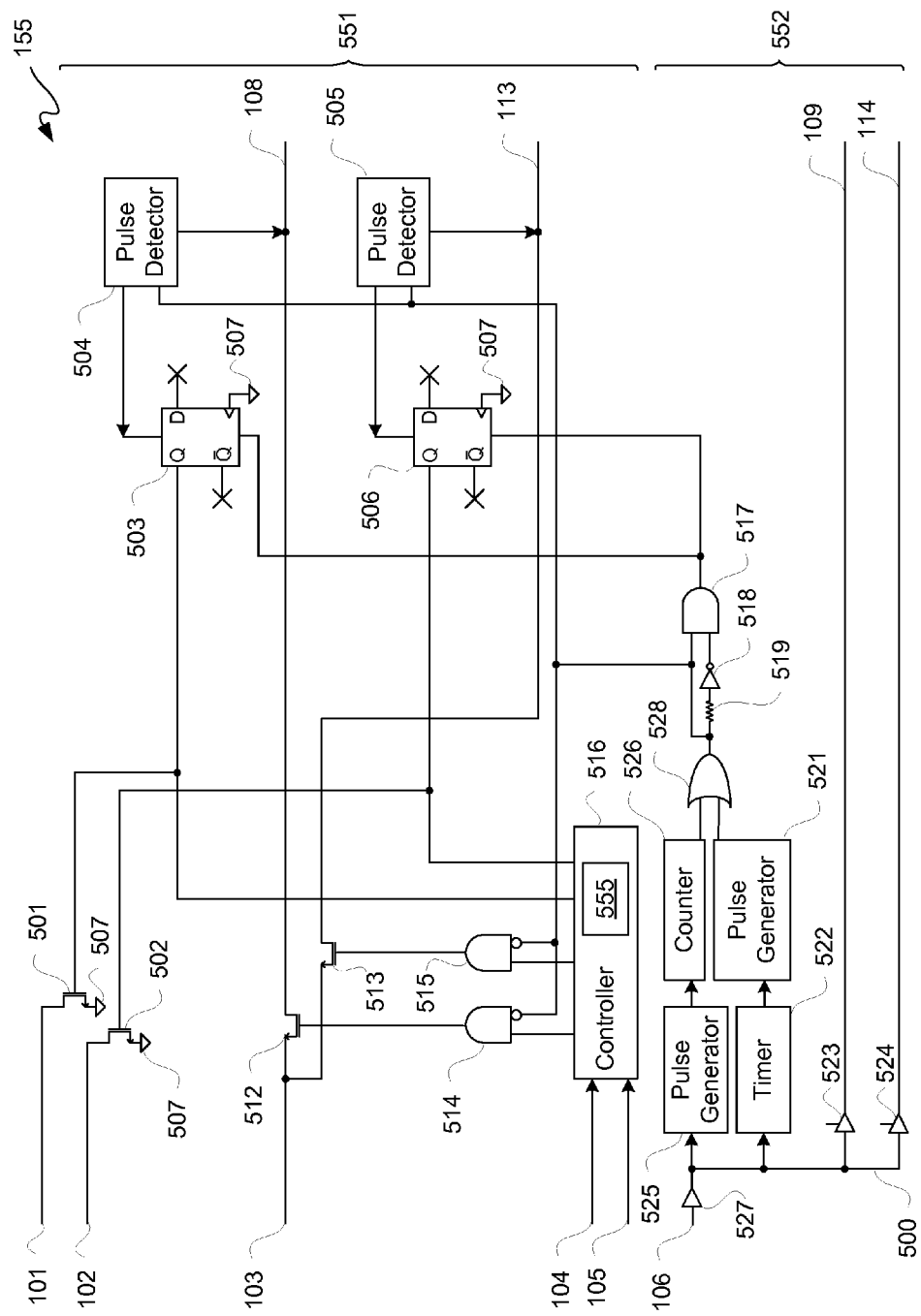
Figures 1, 6:
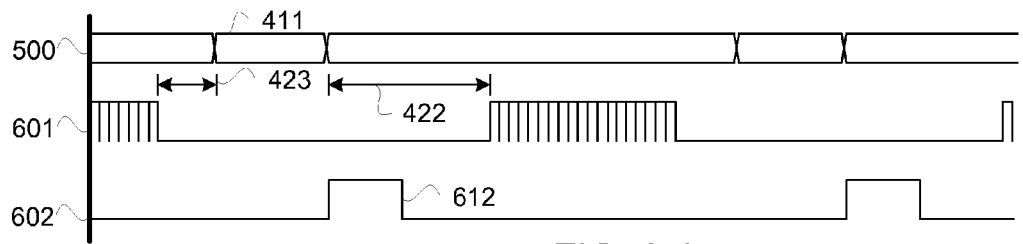
Figures 2, 6:
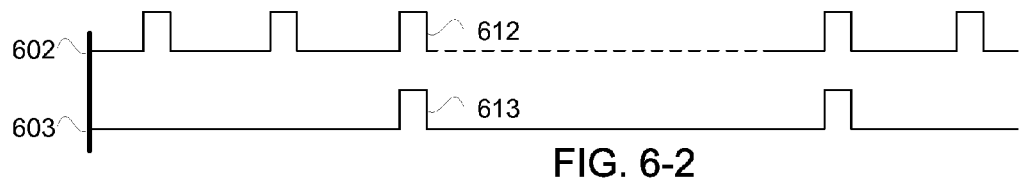
Figures 3, 6:
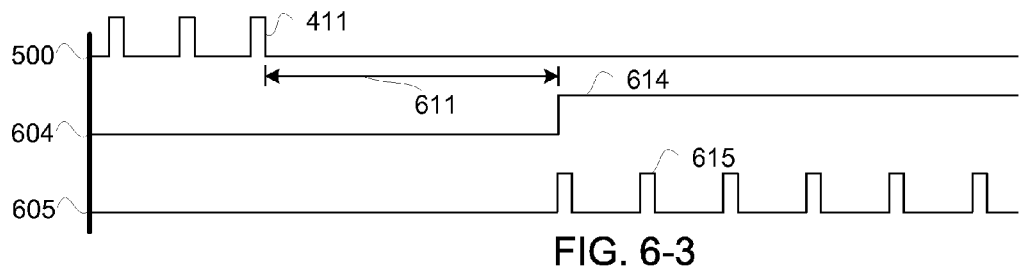
Figures 4, 6:
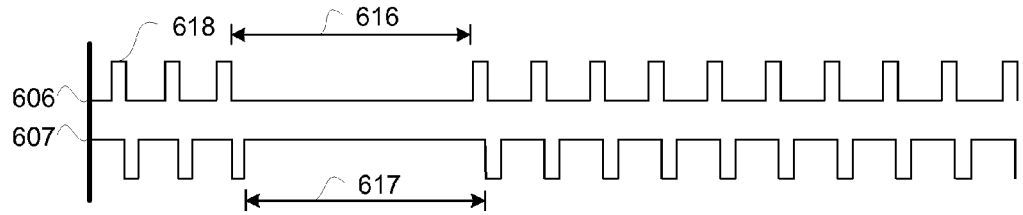
Figures 5, 6:
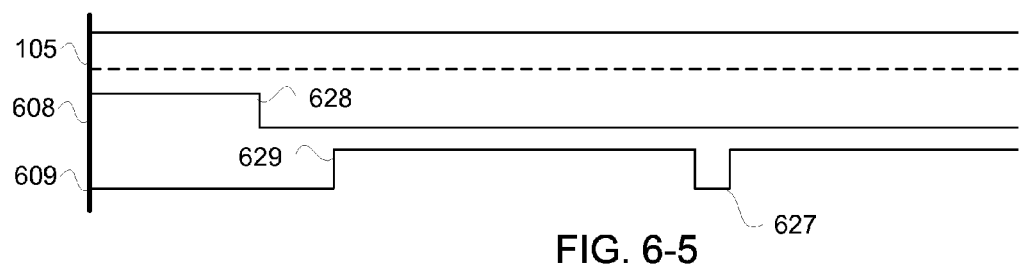
Figure 7:
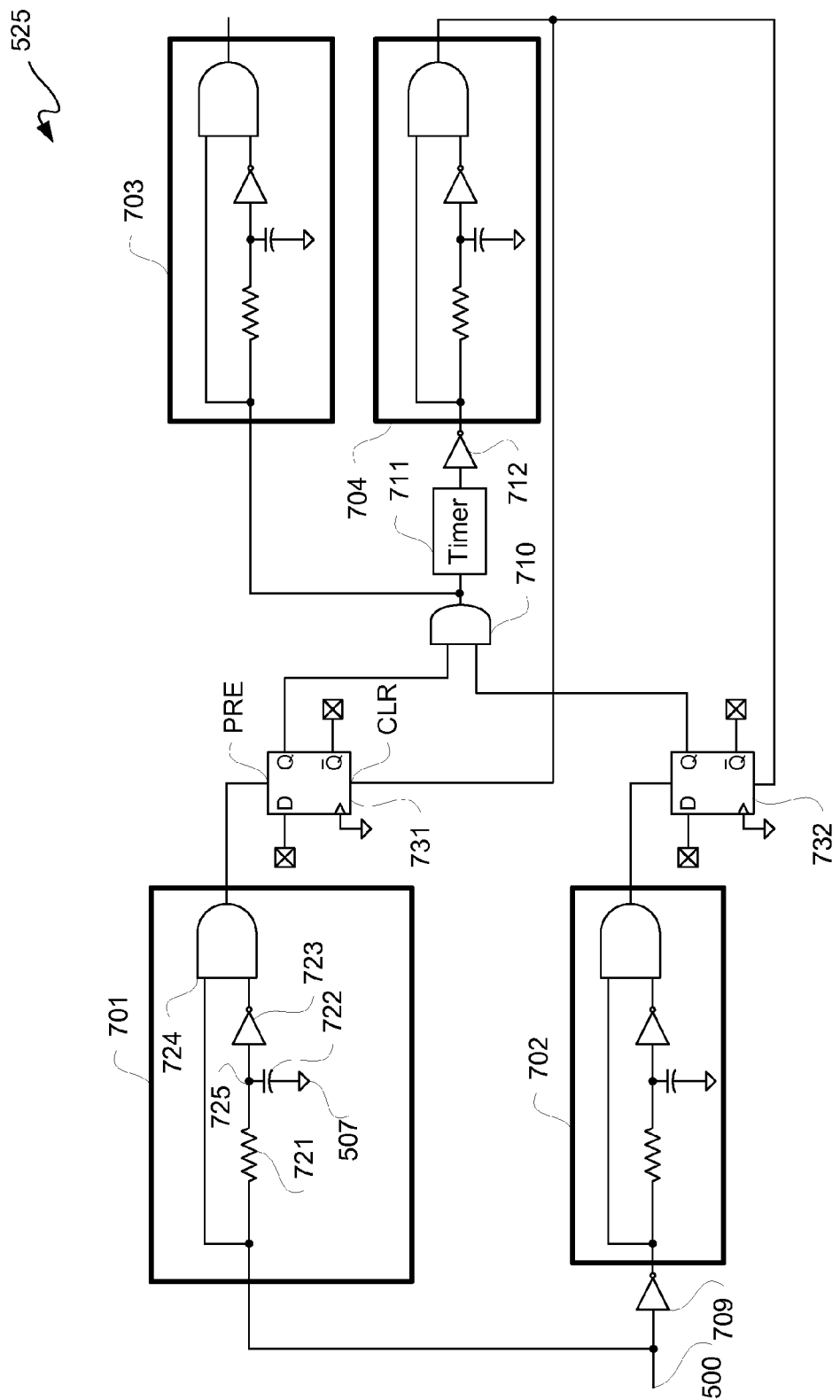
Figure 8:
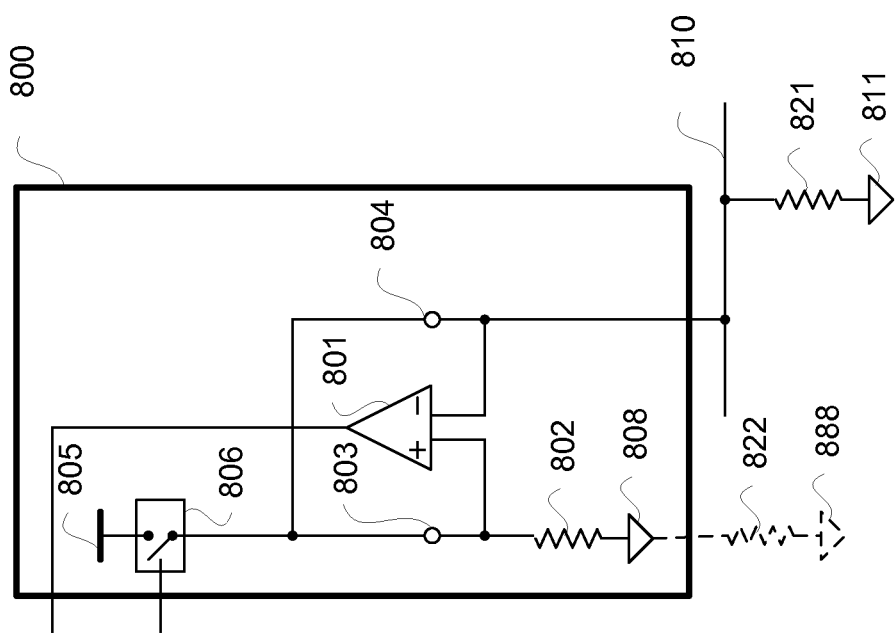

FIG. 1 is a block diagram depicting an exemplary system.
FIG. 2 is a perspective view depicting another exemplary system.
FIG. 3 is a block diagram depicting an exemplary VGA adapter of FIG. 2.
FIG. 4 is a signal diagram depicting an exemplary VGA signals.
FIG. 5 is a circuit/block diagram depicting an exemplary auto-detection module.
FIGS. 6-1 through 6-5 are signal diagrams depicting exemplary signals of the auto-detection module of FIG. 5.
FIG. 7 is a block/circuit diagram depicting an exemplary pulse generator for the auto-detection module of FIG. 5.
FIG. 8 is a circuit diagram depicting an exemplary pulse detector for the auto-detection module of FIG. 5.

DETAILED DESCRIPTION

In the following description, numerous specific details are set forth to provide a more thorough description of the specific embodiments. It should be apparent, however, to one skilled in the art, that the invention may be practiced without all the specific details given below. In other instances, well-known features have not been described in detail so as not to obscure the embodiments. For ease of illustration, the same number labels are used in different diagrams to refer to the same items; however, in alternative embodiments the items may be different. Furthermore, though particular timing values, resistance values, and the like are described herein for purposes of clarity by way of example, it should be understood that the scope of the description is not limited to these particular numerical examples as other values may be used.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it shall be appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present system and methods also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

FIG. 1 is a block diagram depicting an exemplary system 100. System 100 includes a notebook 150 coupled to an external display device 135 and to a docking station ("dock") 125. For purposes of clarity by way of example and not limitation, external display device 135 is described as a monitor 135; however, in other embodiments an external display device may include, without limitation, a projector for example. Likewise, even though a notebook computer is described for purposes of clarity by way of example, in other embodiments a desktop computer or a pad device may be used.

Notebook 150 includes an auto-detection module 155. Auto-detection module 155 may be coupled to analog video ports, namely VGA port 110 and VGA port 120. Even though VGA ports are described for purposes of clarity, any analog video port without an auto-detection pin may be used.

VGA port 110 is of monitor 135, and VGA port 120 is of dock 125. For purposes of clarity, only blue signals 108 and 113, as well as vertical sync signals 109 and 114, are illustratively depicted. However, as is known, a VGA interface includes red, green and blue ("RGB") signals, as well as a horizontal ("H") sync signal and a vertical ("V") sync signal. It should be understood that more generally a VGA port conventionally operates using transistor-transistor logic ("TTL") levels. Along those lines, a VGA port uses source termination impedance for a V sync signal and an H sync signal, but does not use remote or destination termination impedance for V sync and H sync signals. However, color signals use both source and destination termination impedance.

Auto-detection module 155 may be coupled to provide blue signals 108 and 113 respectively to VGA ports 110 and 120. Auto-detection module 155 is likewise coupled to provide V sync signals 109 and 114 respectively to VGA ports 110 and 120.

In this exemplary embodiment, auto-detection module 155 may be coupled to receive output control signals 101 and 102, a blue signal 103 of an RGB signal, an MS control signal 104, a priority/select signal 105, and a vertical source signal 106. These signals are described below in additional detail. Even though a blue signal is described, in other embodiments a red or a green signal may be used. Furthermore, even though RGB signals are described, any like signal for a display device may be used.

FIG. 2 is a perspective view depicting another exemplary system 100. FIG. 3 is a block diagram depicting an exemplary VGA adapter 200 of FIG. 2. With simultaneous reference to FIGS. 1-3, VGA adapter 200 is further described.

In this exemplary embodiment, monitors 135 and 235 are coupled to a VGA adapter 200 via a VGA cable 203 and 233, respectively. Even though a VGA cable is illustratively depicted for purposes of clarity by way of example, in other embodiments for example, monitor 135 may be wirelessly coupled to VGA adapter 200.

VGA adapter 200 is plugged into at least one port 201 of notebook 150. In another embodiment, VGA adapter 200 may be a dongle. In an embodiment, port 201 is a VGA port. However, in another embodiment, port 201 may be an HDMI port or some other port with an auto-detection pin, provided however that monitors 135 and 235 do not have auto-detection pin compatibility. In other words, VGA adapter 200 may be used to serve as a bridge between a VGA monitor and an HDMI port for example, while maintaining usefulness of an auto-detection pin of such HDMI port even though such VGA monitor does not support auto-detection. Thus, known HDMI to VGA conversion circuitry may be enhanced with auto detection module 155 as described herein. However, for purposes of clarity by way of example and not limitation, it shall be assumed that port 201 is a VGA port. Furthermore, even though VGA and HDMI are described, other protocols may be used, such as EGA and DisplayPort, among others. Additionally, even though monitors are illustratively depicted, any display device in accordance with the description herein of having a remote termination resistance may be used. Furthermore, even though a notebook computer is illustratively depicted, any computational device having support for video output may be used.

VGA adapter may include an integrated circuit chip ("IC") having auto-detection module 155 of FIG. 1. Thus, an auto-detection module 155 may be located between an input VGA interface 301 and an output VGA interface 302 of VGA adapter 200. In this exemplary embodiment, input VGA interface 301 is for coupling to a VGA port 201 of notebook 150, and output VGA interface 302 is for coupling to a VGA port 110 of monitor 135.

Accordingly, auto-detection module 155 may be internal or external to a notebook 150 or other device with a VGA or other like display port in accordance with the description herein.

FIG. 4 is a signal diagram depicting exemplary VGA signals 400. Notably, an H sync signal is not depicted for purposes of clarity and not limitation. VGA signals 400 include a red signal 401, a green signal 402, and a blue signal 108, and a V sync signal 403.

A V sync window 410 is generally known as a vertical blanking interval. An interval 420 prior to V sync window 410 is for an active image frame, and an interval 430 after V sync window 410 is for an active image frame. However, if a pulse, such as a detection pulse 412 is added onto any of RGB signals 401, 402, 108, then such pulse may appear on a display even during V sync window 410. In this example, pulse 412 is inserted after V sync pulse 411 of V sync signal 403. The interval after V sync pulse 411 and prior to the beginning of interval 430, namely interval 422, is generally referred to as the "back porch." The interval before V sync pulse 411 and after the end of interval 420, namely interval 423, is generally referred to as the "front porch."

A detection pulse 412 is added to a blue signal 108 in interval 422. Such a detection pulse 412 may be added to any color signal; however, because such detection pulse 412 will flash on a display, a blue flash was selected as being less distracting, because blue is close in color to a black background in which such blue flash is likely to occur due to placement of detection pulse 412. In other words, generally a blue flash in a black background is less visible than a red flash or a green flash. Furthermore, detection pulse 412 may be inserted in interval 423 or 422; however, as insertion in interval 423 in V sync window 410 is more likely to be within a reasonable viewing area of a display than insertion in interval 422, detection pulse 412 is inserted in interval 422. In interval 422, detection pulse 412 is more likely to appear outside of a viewing area ("off-screen"). Additionally, detection pulse 412 need not be inserted in each and every V sync window 410. For example, if a monitor is plugged into a VGA port, it should be sufficient to detect such even within approximately 5 seconds or less. Thus, for example, in an embodiment, a detection pulse 412 may be inserted approximately every 2 seconds in a blue signal 108 in a V sync window 410. However, anywhere from approximately 1/60 of a second to every 5 seconds a V sync window 410 may be used for insertion of a detection pulse 412 onto a color signal.

FIG. 5 is a circuit/block diagram depicting an exemplary auto-detection module 155. Auto-detection module 155 includes a vertical sync pulse detection circuit 552 and a detection pulse insertion circuit 551.

With respect to vertical sync pulse detection circuit 552, a vertical source signal 106 may be provided as an input to buffer 527. Output of buffer 527 may be provided as a vertical sync signal 500. Vertical sync signal 500 may be provided as an input to pulse generator 525, timer 522, driver 523 and driver 524. Drivers 523 and 524 may be coupled to receive respective gating signals for controllably allowing either or both of those drivers to respectively pass vertical sync signals 500 as vertical sync signal 109 and/or vertical sync signal 114. Output of pulse generator 525 may be provided to counter 526, and output of timer 522 may be provided to pulse generator 521. Outputs of counter 526 and pulse generator 521 may be inputs to NOR gate 528.

Output of NOR gate 528 may be a pulse having a longer duration than a detection pulse 412 and may be asserted or active during interval 422 of FIG. 4. Output of NOR gate 528 may be provided to a resistor 519 and an inverter 518 in series. Output of inverter 518, as well as output of NOR gate 528, are provided as inputs to AND gate 517. Output from AND gate 517 is effectively an initial portion of a pulse output from NOR gate 528, namely a detection pulse 412.

With respect to detection pulse insertion circuit 551, output from AND gate 517 may be provided to clear ports of registers 503 and 506. Clock ports of registers 503 and 506 are coupled to ground 507. Data input ports and complement output ports of registers 503 and 506 are not connected ("no connects"). Output of NOR gate 528 may be provided as an activation signal to pulse detectors 504 and 505. A detection signal output from pulse detector 504 may be provided to a preset port of register 503, and a detection signal output from pulse detector 505 may be provided to a preset port of register 506.

A blue signal 103 is pass gated with transistor 512 to provide blue signal 108 and pass gated with transistor 513 to provide blue signal 113. Output from AND gate 514 may be provided to a gate of transistor 512, and output from AND gate 515 may be provided to a gate of transistor 513.

Controller 516 may be coupled to receive priority/select signal 105 and MS signal 104. Controller 516 may be coupled to receive output from register 503 and output from register 506. An input to AND gate 514 may be provided from controller 516, and an input to AND gate 515 may be provided from controller 516. Output from NOR gate 528 is inverted for providing as input to AND gates 514 and 515.

In addition to being provided to controller 516, output from register 503 may be provided to gate a transistor 501, and output from register 506 may be provided to gate a transistor 502. In this exemplary embodiment, transistors 501 and 502, as well as transistors 512 and 513, are NMOS. Source nodes of transistors 501 and 502 are coupled to ground 507. A drain node of transistor 501 may be coupled to receive an output control signal 101, and a drain node of transistor 502 may be coupled to receive an output control signal 102.

Basically, register 503 is used to provide a detection pulse 412 responsive to assertion of a pulse output from AND gate 517 for input to controller 516. In response, controller 516 causes output of AND gate 514 to insert a detection pulse 412 onto blue signal 103. If pulse detector 504 effectively detects a drop in resistance associated with coupling of a source termination impedance and a destination termination impedance in parallel as between a color line and a ground, such as for blue signal 108, then a monitor is plugged into an associated VGA port. It should be understood that a source termination impedance and a destination termination impedance are used in VGA signaling, and thus are not described in unnecessary detail herein.

If pulse detector 504 detects presence of a monitor responsive to a substantial change in a detection pulse 412, pulse detector 504 provides an output to register 503 to cause output from register 503 to go to or stay in a logic high state. For output from register 503 at a logic high state, transistor 501 couples control output signal 101 to ground 507 and provides associated logic high to controller 516. Such a logic high state may be used to maintain in an on state, or turn ON, an associated VGA port.

If, however, pulse detector 504 does not detect the presence of the monitor responsive to no substantial change in detection pulse 412, output from register 503 goes to or stays in a logic low state. For output from register 503 at a logic low state, transistor 501 decouples control output signal 101 from ground 507 and provides an associated logic low to controller 516. Such a logic low state may be used to maintain in an off state or turn off an associated VGA port to save power.

A detection mode may be initiated responsive to detection of a vertical sync pulse. Transistors 512 and 513 may be put in an OFF state to provide a high impedance state on those lines for assertion of a detection pulse. A load on a line associated with a color signal may be detected responsive to assertion of such a detection pulse. For example, if no monitor is connected to a VGA port, resistance on an associated color line may be approximately 75 ohms in an embodiment. However, if a monitor is connected to a VGA port, resistance on an associated color line may be approximately 37.5 ohms in such an embodiment. A dummy current associated with an asserted detection pulse may be used to determine whether either such higher or lower resistance is present on such color line.

Even though a vertical blanking interval was used due to speed as compared with a horizontal blanking interval, it should be understood that in other embodiments a horizontal blanking interval may be used. Along those lines, any blanking interval or any sync interval may be used for load detection as described herein. Additionally, even though load detection is used to determine whether to shut off a video port to save power when a monitor is not plugged in, load detection as described herein may be used for other reasons. For example, load detection may be used to disable or activate a driver, such as a hi-Z state may be maintained for ESD protection, unless a load is detected as described herein. Furthermore, stopping and starting of reading extended display identification data ("EDID") or like data for a VGA monitor may be used in response to whether a load is detected as described herein.

Output control signals 101 and 102 are generated responsive to the above-described monitor detection to support automatic switching between devices based on a plugged-in or unplugged state thereof. Even though two monitor ports are described, it should be understood that a single monitor port or more than two monitor ports may be used. If only one monitor is connected, then port priority is easily selected regardless of state of a priority/select signal 105. Furthermore, it should be understood that load detection as described herein is not limited to monitors, but may be used for any display-type devices or other devices where priority among devices may be invoked.

Assuming only one monitor present, port selection may be described as follows. After powering on, a control state machine 555 of controller 516 may initially go to a low power mode wait state ("low power state") 1, then to a low power mode wait state ("low power state") 2, and then to switch monitor control output signals 101 and 102, as described below in additional detail. At a power on reset state, low power state 1, or low power state 2, outputs of auto detection module 155 may be put in a high impedance ("hi-Z") state, and both output control signals 101 and 102 may be logic low. For example, transistors 512 and 513 may be in an OFF state to provide such hi-Z state at output pins of a chip. At low power state 2, if either control output signal 101 or 102 is logic high, a channel selection may jump to a port 1 active state or a port 2 active state, respectively. If controller 516 is in a port 1 active state, a wait period may be invoked. If control output signal 101 is still logic low after such wait period, controller 516 may return to a low power state 2. If, however, control output signal 101 is logic high after such wait period, then controller 516 may return to a port 1 active state. In either a port 1 or port 2 active state, if controller 516 senses a change of priority and the other of control output signals 101 and 102 likewise becomes active, controller 516 may transition to a de-bounce state and wait for a time. If a priority change is still active, then controller 516 may return to a power on reset state. Otherwise, controller 516 may ignore a priority change, and thus there would be no change in an associated port.

Assuming two monitors are present, port selection may be described as follows. After powering on, a control state machine 555 of controller 516 may go to a low power state 2 and monitor output control signals 101 and 102. Priority may be set to logic low in low power state 2. At low power state 2, when both output control signals 101 and 102 are asserted, a control state machine 555 of controller 516 may transition to a port 1 active state or a port 2 active state depending on a priority value of priority/select signal 105. For this exemplary embodiment, a logic low level for priority/select signal 105 means port 1 is active, and a logic high level for priority/select signal 105 means port 2 is active. If controller 516 is in a port 1 active state and output control signal 101 is logic low, then controller 516 may transition to a de-bounce state and wait for a time. If output control signal 101 is still logic low after such wait time, controller 516 may return to a low power state 2. If, however, output control signal 101 is logic high after such wait time, then controller 516 may return to a port 1 active state. Thus, a first monitor plugged in, regardless of which port among ports is used, is set as a first or highest priority monitor. Therefore, ports do not have to be labeled for monitor one, two, etc.

FIGS. 6-1 through 6-5 are signal diagrams depicting exemplary signals of auto-detection module 155 of FIG. 5. Vertical sync signal 500 includes a V sync pulse 411 between intervals 423 and 422. RGB signal 601, which includes blue signal 103, indicates that intervals 423 and 422, as well as V sync pulse 411 occurred during a time of inactivity of RGB signal 601, namely a vertical blanking interval.

Pulse signal 602 is output from pulse generator 525 to cause assertion of pulses 612. Counter 526 counts pulses 612 to select a vertical sync window in which to assert a pulse 613 of pulse signal 603. Along those lines, not every vertical sync window needs to be used to assert a pulse 613. Vertical sync signal 500 pulses 411 are provided to timer 522 to provide a delay 611 between a vertical sync pulse 411 and an assertion time of a response 614, namely transition from a logic low to a logic high in this example, of timer output signal 604. Responsive to assertion of timer output signal 604, pulse generator 521 and generates pulses 615 on pulse generator output signal 605.

Pulse signal 606 is output from NOR gate 528. Pulses 618 on pulse signal 606 are responsive to pulses 615 output from pulse generator 521. Gaps between pulses 615 are responsive to pulses 613 output from counter 526. Assertion of pulses 618 is to activate a detection state for detecting presence of a monitor and to put transistors 512 and 513 in respective OFF states. Control signal 607, which is effectively a slightly delayed inverse of pulse signal 606, is associated with gating transistors 512 and 513. Intervals 616 and 617 respectively of signal 606 and 607 correspond to periods where there is no vertical sync blanking interval and to delay caused by timer 522, namely delay 611.

Priority/select signal 105 is for selecting between VGA ports 110 and 120 of FIG. 1. For this embodiment, one priority/select signal 105 is logic high as illustratively depicted, VGA port 120 has priority. Control signal 608 is associated with operation of transistor 512, activation of buffer 523, and input to AND gate 514 from controller 516. Control signal 609 may be associated with operation of transistor 513, activation of buffer 524, and input to AND gate 515 from controller 516. As illustratively depicted, VGA port 110 is initially on as indicated by control signal 608; however, generally after a transition at 628, even though a monitor may be detected on VGA port 110, such as VGA port 110 has no priority. As illustratively depicted, VGA port 120 is initially off as indicated by control signal 609; however, generally after a transition at 629, a monitor is detected on VGA port 120 and such VGA port 120 has priority. Inverse pulse 627 of control signal 609 indicates when output of NOR gate 528 is asserted, namely assertion of a pulse 618, in order to temporarily deactivate transistor 513 to confirm or detect presence of a monitor on such VGA port 120.

FIG. 7 is a block/circuit diagram depicting an exemplary pulse generator 525 of FIG. 5. Pulse generator 525 may be coupled to receive vertical sync signal 500. Vertical sync signal 500 may be provided to an input of inverter 709 and to an input of pulse generation block 701. Output of inverter 709 may be provided to an input of pulse generation block 702. Pulse generation blocks 701 through 704 are generally repeats of the same and thus only pulse generation block 701 is described in detail for purposes of clarity.

Pulse generation block 701 includes a resistor 721, a capacitor 722, an inverter 723, and an AND gate 724. Vertical sync signal 500 may be provided to an input port of AND gate 724 and to resistor 721. An input port of inverter 723 is connected in series with a resistor 721 at a common node 725. Capacitor 722 may be coupled between ground 507 and common node 725. Output of inverter 723 may be provided to another input of AND gate 724. Output of AND gate 724 is output from pulse generation block 701.

Output from pulse generation block 701 may be provided to a preset port of register 731. Output from pulse generation block 702 may be provided to a preset port of register 732. Data ports of registers 731 and 732 are not connected. Complemented output ports of register 731 and 732 are not connected. Clock ports of registers 731 and 732 are coupled to ground. Output ports of registers 731 and 732 are respectively coupled to input ports of AND gate 710. Clear ports of register 731 and 732 are respectively coupled to receive output of pulse generation block 704.

Output of AND gate 710 may be provided to an input of timer 711 and an input of pulse generation block 703. Output of pulse generation block 703 is output of pulse generator 525. Output of timer 711 may be provided to an input of inverter 712, and an output of inverter 712 may be provided to an input of pulse generation block 704.

In an embodiment, timer 711 inserts a delay. For purposes of clarity by way of example and not limitation, suppose a vertical sync pulse frequency is 60 Hz, and timer 711 inserts a 1 ms delay. In this example, the distance in time between vertical sync pulses is approximately 16 ms. Any initial vertical sync pulse detected during a 1 ms detection window, whether a positive or negative vertical sync pulse, may be interpreted as a first vertical sync pulse. Using a detection window that can only completely capture one vertical sync pulse, any issue regarding polarity may be overcome. Thus, a vertical sync pulse may be resolved such that a detection window is larger than a width of a vertical sync pulse, but substantially shorter than a period between vertical sync pulses.

FIG. 8 is a circuit diagram depicting an exemplary pulse detector 800. Pulse detector 800 may be pulse detector 504 or 505 of FIG. 5. Pulse detector 800 may be coupled to a color line 810, such as associated with blue signal 108 or 113 for example as previously described. A resistive load 821 may be coupled between a ground 811 and color line 810.

Pulse detector 800 includes a differential amplifier 801, current sources 803 and 804, reference resistor 802, and switch 806. Reference resistor 802 may provide a reference resistance. Switch 806 may be implemented with one or more transistors. Switch 806 may be transition to and from open and closed positions responsive to output from NOR gate 528. In a closed position, switch 806 may couple a supply voltage, such as for example Vdd 805, to current sources 803 and 804. For example, current sources 803 and 804 may be provided with a current mirror circuit.

A minus port of differential amplifier 801 may be coupled to current source 804 and to color line 810. A minus port of differential amplifier 801 may be coupled to current source 803 and to reference resistor 802. Reference resistor 802 may be coupled to ground 808. Output of differential amplifier 801, which may be a digital differential amplifier, may be provided as a detection signal for input to a preset port of a register, such as for example register 503 or 506 as previously described.

Detection of resistance of a monitor may be problematic due to sensitivity concerns. For example, if voltage of detection pulse 412 is large, then a very bright blue flash may be viewable on a display, and this may not be desirable as people may be sensitive to such flashes. Accordingly, a substantially lower voltage level for a detection pulse 412 may be used. However, a driver on such color line 810, or other output line used for such detection, may cause noise on such line which would make detection of a small voltage amplitude of a detection pulse 412 very problematic. By electrically decoupling such line from a driver coupled to it, such as by creating a tri-state or hi-Z condition, a smaller voltage amplitude for detection pulse 412 may be used for load detection as described herein, and so a substantially obtrusive bright flash may be avoided. As previously described for example, transistors 512 and 513 may be put in an OFF state for detection of any termination resistance associated with a monitor. Additionally, by reducing the effect of noise, a less sensitive, and thus less expensive, differential or op amp 801 may be used in a pulse detector 800.

The detection range of resistance may vary from application to application. For example, in some monitors and VGA ports a 150 ohm resistance is used; however, in other monitors and VGA ports a 75 ohm resistance is used. Thus, in an embodiment, in an unplugged VGA port state, resistive load 801 may be approximately 75 to 150 ohms, and in such embodiment, in a plugged VGA port state, resistive load 801 may be approximately 37 ohms. However, in another embodiment, in an unplugged VGA port state, resistive load 801 may be approximately 75 to 150 ohms, and in such embodiment, in a plugged VGA port state, resistive load 801 may be approximately 37 to 50 ohms. Values of a reference resistor 802 of pulse detector 800 may be different for these different embodiments. Likewise, currents of current sources 803 and 804 may be different for these different embodiments.

Because different reference resistances may be used for different applications, reference resistor 802, along with a source termination resistor 801, may be external resistors with respect to an IC die having auto-detection module 155. This allows for a variety of embodiments. However, in another embodiment a default reference resistor 802 may be used internal to such an IC die, where a pin coupled to reference resistor 802 may be coupled to an external ground 888 directly or through one or more other external resistors 822. Furthermore, such one or more external resistors may be coupled to a ground pin of such an IC die or to an external ground 888.

To recap, a detection pulse is inserted onto color line 810, and depending on resistive load on such color line, current associated with such pulse will be affected. Differential amplifier 801 may effectively compare this detected current change using a port resistance in combination with current source 804 as compared to a reference current of current source 803 and a reference resistance. Even if current sources 803 and 804 were identical with identical loads, there may be some measurable difference detected.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, even though specific embodiments of circuitry and signals are described, it should be understood that other circuitry and/or signals may be used in accordance with the description herein.

Claim(s) listing steps do not imply any order of the steps. Trademarks are the property of their respective owners.

What is claimed is:

1. An apparatus for detection of a remote termination resistance, comprising:
   a pulse detection circuit of a pluggable adaptor to generate a detection pulse within a blanking interval;
   a pulse insertion circuit of the pluggable adaptor coupled to receive the detection pulse and configured to insert the detection pulse onto a line associated with a predetermine sync pulse window;
   wherein the line is an analog color signal line for a VGA display; and wherein the pluggable adaptor is configured to plug into a connector with an auto-detection pin to provide a bridge to a display device.

2. The apparatus according to claim 1, wherein the analog color signal line is for an RGB signal.

3. The apparatus according to claim 1, wherein the pulse insertion circuit is configured to insert the detection pulse onto the analog color signal line after a vertical sync pulse within the blanking interval.

4. The apparatus according to claim 1, further comprising:
a driver coupled to the line for driving an analog color signal;
wherein the pulse insertion circuit is configured to tri-state the driver for detecting whether the remote termination resistance is coupled to the port.

5. The apparatus according to claim 1, wherein the blanking interval is a vertical blanking interval.

6. The apparatus according to claim 1, wherein the pulse insertion circuit includes a pulse detector coupled to the line.

7. The apparatus according to claim 1, wherein the pulse insertion circuit is coupled to tri-state a driver coupled to the line for operation of the pulse detector for using a low voltage amplitude for the detection pulse.

8. The apparatus according to claim 1, wherein the pulse detector includes an internal reference resistor.

9. The apparatus according to claim 1, wherein the pulse detection circuit and the pulse insertion circuit are formed as an integrated circuit die.

10. The apparatus according to claim 1, wherein
the pulse detection circuit and the pulse insertion circuit are formed as an integrated circuit die.

11. The apparatus according to claim 10, wherein the connector is for an HDMI compatible display device.

12. The apparatus according to claim 10, wherein the connector is for a VGA compatible display device.

13. A method, comprising:
providing a pluggable adaptor for insertion between a first display port of a computer device and a second display port of a display device;
wherein the pluggable adaptor is configured to plug into a connector with an auto-detection pin to provide a bridge to the display device;
generating a detection pulse within a blanking interval using a pulse detection circuit of the pluggable adaptor; and
inserting the detection pulse onto a line using a pulse insertion circuit of the pluggable adaptor;
wherein the line is an analog color signal line for the display device.

14. The method according to claim 13, wherein the pluggable adaptor is configured to detect a termination resistance of the display device.

15. The method according to claim 14, wherein the first display port and the second display port are respective VGA ports.

16. The method according to claim 13, further comprising:
driving an analog color signal onto the line using a driver of the pluggable adaptor coupled to the line;
wherein the pulse insertion circuit is configured to tri-state the driver for detecting whether a termination resistance of the display device is coupled to the second display port; and
detecting presence of the termination resistance using a low voltage amplitude for the detection pulse.

17. The method according to claim 13, further comprising sending a vertical sync pulse to the display device via another line associated with the second display port.

18. The apparatus according to claim 17, wherein the display device does not have a termination resistor associated with the other line.

* * * * *